(12) United States Patent
Maberry et al.

(10) Patent No.: US 6,814,145 B2
(45) Date of Patent: Nov. 9, 2004

(54) SHEAR-SENSITIVE PLUGGING FLUID FOR PLUGGING AND A METHOD FOR PLUGGING A SUBTERRANEAN FORMATION ZONE

(75) Inventors: Jack Maberry, Paris (FR); Greg Garrison, Katy, TX (US); Andre Garnier, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 48 days.

(21) Appl. No.: 10/172,266

(22) Filed: Jun. 14, 2002

(65) Prior Publication Data

US 2003/0029616 A1 Feb. 13, 2003

Related U.S. Application Data

(60) Provisional application No. 60/334,444, filed on Nov. 29, 2001, and provisional application No. 60/309,538, filed on Aug. 2, 2001.

(51) Int. Cl.[7] ............................................... E21B 33/13
(52) U.S. Cl. ..................... 166/294; 166/295; 106/719; 507/903; 507/114
(58) Field of Search ............................. 166/294, 295; 670/507, 114, 241, 269, 273, 903; 106/719

(56) References Cited

U.S. PATENT DOCUMENTS

| | | | | |
|---|---|---|---|---|
| 3,284,393 A | * | 11/1966 | Vanderhoff | ................ 524/801 |
| 3,948,672 A | * | 4/1976 | Harnsberger | ............... 106/720 |
| 4,199,625 A | * | 4/1980 | Pilny et al. | ............... 427/385.5 |
| 4,366,194 A | * | 12/1982 | Pilny et al. | ............... 427/385.5 |
| 4,413,121 A | | 11/1983 | Brandt et al. | ................ 536/44 |
| 4,445,576 A | * | 5/1984 | Drake et al. | ................ 166/291 |
| 4,532,052 A | * | 7/1985 | Weaver et al. | ............... 507/222 |
| 4,663,366 A | | 5/1987 | Drake et al. | ................ 523/130 |
| 4,712,617 A | * | 12/1987 | Kocsis | ................ 166/270 |
| 5,104,912 A | * | 4/1992 | Hoskin | ................ 523/130 |
| 5,304,620 A | * | 4/1994 | Holtmyer et al. | ............ 527/310 |
| 5,363,916 A | * | 11/1994 | Himes et al. | ............... 166/276 |
| 5,439,057 A | | 8/1995 | Weaver et al. | .............. 166/295 |
| 5,663,123 A | * | 9/1997 | Goodhue et al. | ........... 507/225 |
| 5,680,900 A | | 10/1997 | Nguyen et al. | .............. 166/295 |
| 5,717,131 A | | 2/1998 | Sunde et al. | ................ 73/64.41 |
| 5,919,739 A | | 7/1999 | Sunde et al. | ................ 507/213 |
| 6,202,751 B1 | * | 3/2001 | Chatterji et al. | ............. 166/276 |
| 2003/0029615 A1 | * | 2/2003 | Maberry et al. | ............ 166/294 |

FOREIGN PATENT DOCUMENTS

| | | | | |
|---|---|---|---|---|
| NO | WO009428085 | * | 12/1994 | ............ C09K/7/02 |
| NO | WO009856868 | * | 12/1998 | ............ C09K/7/06 |
| NO | WO009856869 | * | 12/1998 | ............ C09K/7/06 |
| WO | 98/56870 | | 12/1998 | |
| WO | 00/75481 | | 12/2000 | |

\* cited by examiner

*Primary Examiner*—Robert J. Sandy
*Assistant Examiner*—Katherine Mitchell
(74) *Attorney, Agent, or Firm*—Thomas O. Mitchell; Robin Nava; Brigitte L. Echols

(57) ABSTRACT

A plugging fluid for plugging a subterranean formation zone surrounding a drill hole comprises an emulsion comprising a dispersed aqueous phase containing an aqueous base and a continuous hydrophobic phase containing a polymer consisting of a grafted cellulose ether derivative, a surfactant and a crosslinking activator of the polymer. The polymer is preferably 2-hydroxyethyl cellulose grafted with vinyl phosphonic acid. Upon shearing, preferably through the drilling bit, the emulsion inverts so that the rupture of the emulsion droplets releases the crosslinking activator into the water phase thus forming a gel structure.

8 Claims, No Drawings

SHEAR-SENSITIVE PLUGGING FLUID FOR PLUGGING AND A METHOD FOR PLUGGING A SUBTERRANEAN FORMATION ZONE

REFERENCE TO RELATED PROVISIONAL APPLICATION

This application claims the benefit of the U.S. Provisional Application Ser. No. 60/309,538 filed Aug. 2, 2001 and U.S. Provisional Application Ser. No. 60/334,444 filed Nov. 29, 2001.

TECHNICAL FIELD OF THE INVENTION

The present invention relates to a reactive plugging fluid designed to gel rapidly when subjected to high shear stress. The invention also relates to a method for plugging a subterranean formation zone, especially for curing massive mud losses when drilling a well.

BACKGROUND OF THE INVENTION

Lost circulation while drilling is a major problem. The well cost dramatically increases due to the lost time from delayed well production and also due to associated drilled problems such as pipe sticking and safety issues. The most common technique to combat lost circulation is to add into the drilling fluid a lost circulation material (LCM). Granular flakes and fibrous particles, essentially based on cellulosic materials, are used for sealing off fractures, vugs and porous zones. Minerals such as mica are also commonly used. If even high concentrations of lost circulation materials fail to restore the drilling fluid circulation, a cement plug is placed. The cement plug consolidates the voids but also fills the open wellbore and needs to be drilled before continuing the well drilling. Quite often, the procedure must be repeated several times before achieving a correct seal.

Other techniques involve the use of reactive fluids. Two reactive fluids are either mixed near the formation where lost occurs with a first fluid pumped through the drill-string and a second fluid displaced down the annulus. At the interface of the two fluids, the turbulent flow allows the rapid formation of a rubbery solid mass commonly known as a gunk. Another practice uses crosslinked polymer gels whose reaction is initiated on surface. In both case, the technology is highly risky since slight changes in the composition, temperature or fluid contamination may lead to premature gellation in and around the bottom hole assembly, leading to major operation failure.

It is also known to use as plugging fluids so-called rheotropic liquids that thicken when subjected to high stress. U.S. Pat. No. 4,663,366 discloses such a polycarboxylic acid containing water-in-oil emulsion where the oil phase contains hydratable water-swelling hydrophilic clay such as bentonite and the aqueous phase contains a dissolved polyacrylamide and a polycarboxylic acid. The setting of this plugging fluid takes place as a result of a swelling of the bentonite when bentonite contacts water. Each dispersed droplet of the aqueous phase is coated with a polymeric material so that the contact only occurs when the emulsion is subjected to high shear forces that break this coating.

Another rheotropic plugging fluid is known from U.S. Pat. No. 5,919,739 (Sunde et al.). Like the emulsion of the U.S. Pat. No. 4,663,366, the fluid is based upon a 'loose' invert emulsion. The continuous phase provides an encapsulation medium for a crosslinker and the internal phase consists of a high concentration of a polymer while the interfacial tension between the two phases is maintained by a concentration of a lipophilic surfactant.

A preferred plugging fluid of the Sunde et al. patent application consists of about 25% by volume of a continuous phase containing an hydrophobic liquid selected from mineral oils, vegetable oils, esters and ethers, an emulsifier on a triglyceride basis, bentonite and calcium hydroxide and of about 75% by volume of a dispersed aqueous phase containing water, xanthane and optionally, a weighting material such as barite. When this type of fluid experiences a significant pressure drop, an inversion of the emulsion occurs and the crosslinker is released into the aqueous phase resulting in the formation of a gel.

This latter type of plugging fluid can be stored for several weeks without reacting and pumped with a centrifugal pump for several hours. Gellation is fast and triggered only by subjecting the plugging fluid to high shear forces, for instance when forced through the drill bit. However, the use of this type of plugging fluid is limited by lack of robustness and shrinkage over time. Moreover, above a temperature threshold of about 90° C., the gel becomes less rigid and turns into a viscous fluid due to the breaking of the crosslinked bonds.

It would therefore be desirable to provide a new plugging fluid suitable to effectively seal off the problem zone and stable across a wide temperature range. There is also a need in well control for better procedures, including placement strategies to help in making jobs successful.

SUMMARY OF THE INVENTION

Thus, the invention provides a plugging fluid for plugging a subterranean formation zone surrounding a drill hole consisting of an emulsion comprising a dispersed aqueous phase containing an aqueous base, and a continuous hydrophobic phase containing a hydroxyethylcellulose derivative graft polymer, a surfactant and a crosslinking activator of the hydroxyethylcellulose polymer.

The emulsion is believed to be invert (water-in-oil) though it might actually be direct (oil-in-water) with further water droplets within the large oil droplet, i.e. an invert emulsion in a direct emulsion.

The grafter polymers useful to carry out the invention are cellulose ether derivative with vinyl phosphonic acid grafts.

The cellulose ether derivative is preferably a hydroxyalkyl cellulose where the alkyl is selected from the group of ethyl and propyl. The preferred hydroxyalkyl cellulose is 2-hydroxyethylcellulose. A process for preparing cellulose ethers having at least one phosphorous containing substitute is known from U.S. Pat. No. 4,413,121, which is hereby referred to and incorporated by reference.

The principle of the setting of the plugging fluid of the present invention is essentially the same as for the plugging fluid of U.S. Pat. No. 4,663,366 discussed above. It is the crosslinking of the grafted hydroxyalkyl cellulose that causes the gel formation. Crosslinkable cellulose derivatives are known as state-of-the-art polymeric viscosifiers used in the oil industry in particular for controlling fluid loss in subterranean formations. Reference is made for instance to U.S. Pat. Nos. 5,439,057 and 5,680,900. A crosslink bond is created between a metal ion and the pendant groups along the polymer chain of the polysaccharides. Upon exposing the plugging fluid to a pressure drop greater than 2 MPa over a small dimension, it is believed that the emulsion inverts or flips from its invert state into a more stable direct state. The rupture of the emulsion droplets releases the crosslinker activator into the water phase thus providing metallic divalent ion to crosslink with the cellulose ether derivatives and forming the gel structure.

DETAILED DESCRIPTION OF PREFERRED EMBODIMENTS

The preferred polymer utilized in this invention is a derivatized hydroxyethylcellulose, more specifically, 2-hydroxyethyl cellulose, vinyl phosphonic acid graft polymer. The ratio of 2-hydroxyethyl cellulose to vinyl phosphonic acid monomers in the graft polymer typically ranges from about 5% to about 20% and a preferred ratio is from about 10% to about 12%. Range of concentration is from 0.1 to 2 wt %, with 2 wt % generally preferred. Increased polymer concentrations result in more rigid gels.

The crosslinker agents or crosslinker activator admixtures are selected from the groups consisting of iron III compounds, boron (such as boric acid, borate salts), titanium IV, zirconium IV, aluminum III, antimony V, compounds containing divalent calcium and magnesium ions (for example magnesium oxide and calcium oxide), amines (mono, di or trialkanol; cocoamines, pentamines, alkyldiethanol amines), acetates (such as sodium acetate), sodium hydroxide, potassium hydroxide, and buffers, such as sodium carbonate, potassium carbonate, and sodium acetate; and/or other additives which generate hydroxyl ions in aqueous solutions, such as ammonia, ammonia compounds and ammonia generating compounds, for example, urea; chelating agents such as sodium lactate, salts of hydroxyethylaminocarboxylic acid—such as hydroxyethylethylenediaminetriacetic acid (EDTA), sodium gluconate, sorbitol, and glycerol.

The preferred crosslinking/pH control agents are magnesium oxide, sodium carbonate, EDTA, and sodium tetraborate. The concentration range for magnesium oxide is from 0.01 to 3 wt %, preferably from about 0.5 to about 1.5 wt %. The concentration range for sodium carbonate is from 0.01 to 3 wt %, preferably from about 0.1 to 1 wt %. The concentration range for EDTA is from 0.01 to 3 wt %, preferably from about 0.1 to 1 wt %; and the concentration range for the sodium tetraborate is from about 0.01 to 3 wt %, preferably from about 0.1 to 1 wt %.

Any clean liquid hydrocarbon can be used for the oil phase. The oil may advantageously be selected from any base oil suitable for drilling fluids such as mineral oils, vegetable oils, esters and ether oils, diesel, alpha-olefins, polyolefines, n-alkanes, and mixtures thereof. Selected oils must be of compatible with the used drilling fluids and the environmental regulations that for instance prohibit use of aromatic containing oils on offshore rigs. The concentration range for the oil phase is from about 5 to about 70 wt %, and preferably from about 10 to about 25%.

The used water is preferably fresh tap water. Non-contaminated drill water such as seawater or light brine diluted with about 50% fresh water can also be used. The concentration range is from about 30 to about 95 wt %, more preferably from about 70 to about 90 wt %.

The crosslink bond created between the metal ion and the hydroxyl groups concurs if the pH is ranged between 11 and 13.

Conventional commercially available emulsifiers can be used, selected on the basis of their compatibility with alkali environment and the intended temperature of use. Lipophilic surfactants, used to prepare water-in-oil emulsion drilling fluids comprising a high water content (greater than 50% by volume) and known to those skilled in the art can provide the required emulsion strength. Preferred emulsifiers are based on combination of fatty acids and polyamides or on triglyceride. The setting time of the plugging fluid depends on the amount of emulsifier: the addition of a small amount of emulsifier will result in a very short setting time and a highly unstable emulsion. Conversely, large concentration of emulsion will result in a too stable fluid, a very long setting time and higher shear pressures required for gelling. The preferred surfactants are polyamide derivatives, with concentrations ranging from about 0.01 to about 5 wt %, and most preferably from about 0.1 to about 3 wt %, to control the shear rate required to invert the emulsion.

The plugging fluid according to the present invention may optionally comprise additional additives such as a setting accelerator, lost circulation material and extenders.

The plugging system according to the present invention may be used to an extended range of temperatures, ranging from about 40° F. to about 325° F. (about 4° C. to about 163° C.).

Though it is not preferred, the plugging fluid may also comprise conventional lost circulation material such as nut plug, fibers, calcium carbonate, mica etc. If the plugging fluid is subjected to pass through the drill bit, then the lost circulation materials must be of fine or medium grade depending on the size of the jets at the bit.

Extenders such as clays are commonly used in wellbore fluid to improve the suspension of solids, to keep particulate solids, such as bridging agents, from separating. Bentonite is preferred due to its ability to absorb large amounts of water, thus preventing dilution of the gel by water influx. Bentonite further increases the gel strength of the slurry and improves the suspension of solids when lost circulation material is further included.

The plugging fluid of the invention can also be used in conjunction with weighting agents. The weighting agents are selected from the group consisting of barite, ilmenite, hematite, manganese and calcium carbonate. With the solid weighting additives added to the oil phase, the density may be typically adjusted between 0.98 g/cm$^3$ (no weighting agent) and 1.68 g/cm$^3$. Where the solid weighting additives are added to the aqueous phase, higher density may be achieved, up to about 2 g/cm$^3$.

A preferred plugging fluid according to the present invention comprises 15.65 wt % of diesel oil, 0.18 w % of a polyamide derivative (emulsifier), 1.96 w % of a derivatized hydroxyethylcellulose (2-hydroxyethylcellulose 89–90 w %, vinyl phosphonic acid graft polymer 10–11 wt %, molecular weight 1,300,000), 78.27 w % of fresh water, and as crosslinking agent/activator, 1.27 w % of magnesium oxide, 0.51 w % of sodium carbonate, 0.67 w % of sodium tetraborate pentahydrate and 0.51 w % of the tri-potassium salt of EDTA.

According to a preferred variant of the present invention, the method for preparing the new plugging fluid comprises the steps of dissolving the emulsifier into the oil, under gentle agitation (for instance about 400 RPM), for about 2 minutes, adding all other liquid or solid additives, including the polymer, to the base oil, under the same gentle agitation for about the same period of time to prepare a pre-mix that comprises all the constituents of the emulsion but water and adding water for instance with a static mixer immediately before pumping it downhole so that the polymer does not migrate into the aqueous phase and consequently, is not hydrated before the breakage of the emulsion. It is worth noting that a substantial migration and hydration of the polymer is obtained in a period of several minutes, for instance between about 15 and 30 minutes. According to this preferred embodiment of the invention, the emulsion is pumped less than 1 minute, and preferably about 30 seconds after the mixing so that no significant hydration can occur in such a small period of time.

This pre-mix can be stored and leave on location until needed provided unplanned addition of water is prevented to avoid a dramatic increase of the viscosity.

One aspect of the present invention is a method for placing a plug in a well bore to treat lost circulation. The recommended practice after encountering a lost circulation zone is to treat the zone as soon as possible. The depth of the lowest lost circulation zone can be found by logging (for instance with imaging tools) or by plotting depth versus loss rate. Accurate location is a key to make sure that the plugging pill will be placed below the area of lost circulation. The pill is preferably pumped through the drill bit nozzles using pills having a volume of about 5–15 m³. After the pumping of a first pill, the well is allowed to equilibrate and attempts should be made to attempt circulation. If full circulation is not obtained, then two or three pills may be needed to effectively seal the zone.

These and other features of the invention will become appreciated and understood by those skilled in the art from the detailed description of the following examples.

Laboratory Evaluation & Example

A fluid pill was mixed according to the preferred formulation, thus consisting of 80 g of diesel oil, 0.94 g of a polyamide derivative (emulsifier), 10 g of a derivatized hydroxyethylcellulose (2-hydroxyethylcellulose 89–90 w %, vinyl phosphonic acid graft polymer 10–11 wt %, molecular weight 1,300,000), 400 g of fresh water, and as crosslinking agent/activator, 6.5 g of magnesium oxide, 2.6 g of sodium carbonate, 3.4 g of sodium tetraborate pentahydrate, 5 g fine silica and 2.6 g of EDTA (tri-potassium salt).

The oil is placed in a vessel and agitated. To the agitated oil phase the surfactant is added slowly until the surfactant is dissolved in the oil, under agitation of at 400 RPM for 2 minutes. Solid additives (Magnesium oxide, sodium carbonate, polymer, sodium tetraborate pentahydrate, fine silica and Ethylenediamine tetra-acetic acid) are next added (in any order) to the base oil under agitation 400 RPM for a further 2 minutes. The emulsion is formed by slowly adding water to the agitated oil phase and the while increasing the blender speed to a maximum of 600 rpm in order to obtain the desired emulsion in less than 30 seconds.

Procedure for Inverting the Emulsion with Shear

The emulsion is inverted on exposure to shear. The shear can be simulated in the laboratory in a number of ways. As an example, three different methods are provided below: using a shearing unit, using a modified API fluid loss cell, and using a blade-type mixer (Waring commercial blender).

1) Using a Shearing Unit—similar to that described in U.S. Pat. No. 5,717,131

The emulsion is poured in the reservoir, the pressure inlet is adjusted to 7 bars (100 psi) and the shearing nozzle is set at 35 bars (500 psi) by initially testing with a low viscous fluid. The flipped emulsion is collected at the outlet in a plastic beaker or small plastic cubes, or a rubber hose for subsequent extrusion tests.

2) Using a modified API fluid loss cell

In a high temperature high-pressure fluid loss cell used normally to run fluid loss tests for cement slurries. A piston equipped with two O-rings to have a good contact is added into the cell. The piston is pushed to the bottom of the inverted fluid loss cell. The emulsion is poured into the fluid loss cell and a spacer without the filter screen is added to prevent leakage and the cap is fixed. This cap is equipped with a valve with a ¼ inch end. The fluid loss cell is reversed and placed on its stand and connection for pressure is mounted. A pressure of 35 bars (500 psi) is applied. The top valve is opened allowing pushing the emulsion via the piston. The bottom valve is shortly opened and closed to prevent projections and the flipped emulsion is collected in a plastic beaker or small plastic cubes.

3) Using a Blade-Type Mixer

After the emulsion is prepared, it is mixed for 20 seconds at 7,000 RPM in a blade-type mixer. The flipped emulsion is poured in a plastic beaker or small plastic cubes.

Extrusion Test Method

Emulsion is prepared as mentioned above and flipped with the shearing unit. At the outlet of the shearing unit a rubber hose is connected. The inverted ("flipped") passes through the hose, filling it completely. As soon as the flipped emulsion escapes the hose, the hose is disconnected from the shearing unit and connected to a pressure line. Pressure is adjusted with a regulator allowing nitrogen gas to push the gel. The pressure needed to extrude the gel is read on the digital gauge and recorded. This extrusion test can be performed on gel in the rubber hose immediately after flipping or it can be allowed to age for a period of hours prior to extruding.

It is also possible to connect the rubber hose to the modified API fluid loss cell in order to flip the emulsion in the rubber hose. Extrusion tests can then be performed on the gel.

Data for Preferred Formulation Performed at Ambient Temperature

| Emulsion sheared with the . . . | Hydration time of the prepared emulsion prior to shearing (hour) | Pressure required to extrude the gel immediately after shearing | Pressure required to extrude the gel after aging in the rubber hose for 1 hour | Pressure required to extrude the gel after aging in the rubber hose for 2 hours |
|---|---|---|---|---|
| shearing unit | 1 | 16 psi [230400 lb/100 ft²] | 84 psi [1209600 lb/100 ft²] | |
| fluid loss cell | 1 | 12 psi [172800 lb/100 ft²] | 60 psi [864000 lb/100 ft²] | 70 psi [1008000 lb/100 ft²] |
| fluid loss cell | 17 | 12 psi [172800 lb/100 ft²] | 80 psi [1152000 lb/100 ft²] | |

The gels were sheared at room temperature and placed at temperature up to 325° F. The gel was then cooled and visually inspected. In another test, the emulsion was taken to 300° F. prior to shearing and subsequently sheared. In both cases, a strong gel was formed even if the gel formed at 300° F. was actually stronger.

Yard Test

A yard test was conducted to evaluate the formation of an emulsion through a static mixer, as it might be suitable for offshore applications. The static mixer improved the contact between the oil phase and mixing water in order to create a homogenous emulsion. A restriction (choke) was used to provide the pressure drop required to flip the emulsion and form a gel.

An un-weighted emulsion was prepared, consisting of 320 liters of diesel oil (base oil), 19.2 liters of a polyamide derivative (emulsifier), 24.09 kg of a crosslinking activator comprising magnesium oxide, dihydrogenated tallow dimethyl ammonium bentonite and ethoxylated octyl phenol, 4.82 kg of soda ash as a buffer, 48.23 kg of a viscosifier, a derivatized hydroxyethylcellulose (2-hydroxyethylcellulose 89–90 w %, vinyl phosphonic acid graft polymer 10–11 wt %, molecular weight 1,300,000), 12.53 kg of sodium tetraborate decahydrate, 9.64 kg of tetra sodium ethylenediaminetetraacetate (tetrasodium EDTA), 24.09 kg of crystalline silica powder and 1927 liters of water.

A weighted emulsion was also prepared, consisting of 357.7 liters of base oil, 14.31 liters of the emulsifier, 17.89 kg of the crosslinking activator, 3.58 kg of the buffer, 35.78 kg of the viscosifier, 9.30 kg of sodium tetraborate decahydrate, 7.16 kg of tetrasodium EDTA), 17.89 kg of crystalline silica powder and 1430 liters of water.

Before mixing the oil phase, the choke was calibrated with water and all the lines were pressure-tested. Two barrels (317.97 liters) of oil were added, along with the emulsifier, to the tub, circulated and displaced to the discharge tank to remove any water in the lines.

The emulsifier was first added to the oil phase in the tub. The mixture was allowed to mix for two minutes. The solid additives were then mixed and the mixture was allowed to stir for 10 minutes. Two separate pipelines were used for pumping the oil phase and water. The two lines jointed together to form one single line and hence the beginning of the creation of the emulsion. Four different configurations were used in preparing the gel.

- valves lined up to avoid the emulsion passing through the static mixer and lines not equipped with any restriction;
- valves lined up to pass through static mixer and the choke, which created a pressure drop equal to 250 psi before reaching the outlet.
- emulsion not passing through the static mixer and passing through the choke.
- emulsion passing through the static mixer without the choke installed.

As the oil phase was mixed in the tub, samples were collected and using a blade-type mixer, water was mixed in to verify the homogeneity of the emulsion. The tests reproduce previous results achieved in the laboratory. Due to the small volume, the temperature of the tub increased. To ensure dissolution of the polymer, for the weighted solution, the polymer was gently added immediately after the addition of the emulsifier. The mixture was allowed to stir for no less than 10 minutes with the other chemicals being added as was previously done.

The oil phase was weighted successfully with the addition of barite. After the addition of water through the static mixer, a homogenous emulsion was formed. The oil phase was measured using a pressurized mud balance and the density was 1.69 g/cm$^3$.

Overall, the results were as expected. The addition of the choke did provide the pressure drop needed to flip the emulsion from its oil phase to the water phase and produce a strong gel with a pressure drop of 250 psi. In absence of a choke, the static mixer alone was not enough energy produced to flip the emulsion.

What is claimed is:

1. A plugging fluid for plugging a subterranean formation zone surrounding a drill hole essentially consisting of an emulsion comprising a dispersed aqueous phase containing an aqueous base and a continuous hydrophobic phase containing a polymer consisting of a grafted cellulose ether derivative, a surfactant and a crosslinking activator of the polymer.

2. The plugging fluid of claim 1, wherein the polymer is a grafted hydroxyalkylcellulose polymer derivative graft polymer.

3. The plugging fluid of claim 2, wherein the polymer is 2-hydroxyethyl cellulose grafted with vinyl phosphonic acid.

4. The plugging fluid of claim 3, wherein the ratio of 2-hydroxyethyl cellulose to vinyl phosphonic acid monomers in the graft polymer ranges from about 5% to about 20%.

5. The plugging fluid of claim 1, wherein the crosslinking activator of the polymer are selected from the groups consisting of compounds providing iron III, boron, titanium IV, zirconium IV, aluminum III and antimony V ions; compounds containing divalent calcium and magnesium ions, amines, acetates, sodium hydroxide, potassium hydroxide, sodium carbonate, potassium carbonate, sodium acetate, ammomia, ammonia generating compounds, chelating agents, sodium gluconate, sorbitol, and glycerol and mixture thereof.

6. The plugging fluid of claim 1, wherein the oil is present in a concentration of from about 5 to about 70 wt %, and the water is present in a concentration of from about 30 to about 95 w %.

7. A plugging fluid comprising from about 10 to 25 wt % of diesel oil, 0.1 to 3 w % of a polyamide derivative, 0.1 to 5 w % of a 2-hydroxyethylcellulose grafted with vinyl phosphonic acid, 70 to 90 wt % of fresh water, 0.5 to 1.5 w % of magnesium oxide, 0.5 to 1 w % of sodium carbonate, 0.1 to 1 w % of sodium tetraborate pentahydrate and 0.1 to 1 w % of the hydroxyethylethylene-diaminetracetic acid.

8. A plugging fluid for plugging a subterranean formation zone surrounding a drill hole essentially consisting of an emulsion comprising a dispersed aqueous phase containing an aqueous base and a continuous hydrophobic phase containing a polymer consisting of a grafted cellulose ether derivative, a surfactant and a crosslinking activator of the polymer, wherein said crosslinking activator comprises an admixture consisting of magnesium oxide, sodium carbonate, hydroxyethylethylene-diaminetriacetic acid, and sodium tetraborate.

* * * * *